US005542513A

United States Patent [19]
Reyes

[11] Patent Number: 5,542,513
[45] Date of Patent: Aug. 6, 1996

[54] PARKING BRAKE SYSTEM

[76] Inventor: Daniel Reyes, 11530 Griffing Blvd. #11, North Miami, Fla. 33161

[21] Appl. No.: 207,366

[22] Filed: Mar. 7, 1994

[51] Int. Cl.$^6$ .................................................. F16D 67/02
[52] U.S. Cl. .............................................. 192/9; 192/4 A
[58] Field of Search ........................................ 192/9, 4 A

[56] References Cited

U.S. PATENT DOCUMENTS

| | | | |
|---|---|---|---|
| 3,455,418 | 7/1969 | Littman | 188/162 |
| 3,539,038 | 10/1970 | Taber | 188/162 |
| 4,224,832 | 9/1980 | Prohaska | 74/388 |
| 4,561,527 | 12/1985 | Nakamoto | 192/4 A |
| 4,629,043 | 12/1986 | Matsuo | 192/4 A |
| 5,004,077 | 4/1991 | Carlson | 188/2 D |
| 5,067,366 | 11/1991 | Gandiglio | 74/535 |
| 5,119,912 | 6/1992 | Martin | 192/4 A |
| 5,131,288 | 7/1992 | Barlas | 74/512 |
| 5,178,237 | 1/1993 | Ursel | 188/106 P |
| 5,180,038 | 1/1993 | Arnold | 188/171 |

*Primary Examiner*—Andrea L. Pitts
*Attorney, Agent, or Firm*—J. Sanchelima

[57] ABSTRACT

An automatic parking brake system for a vehicle with an electric starter motor with a conventional solenoid and also a modified contactor assembly that is used to selectively activate the motor and set the wheel brake of a vehicle. An additional solenoid is used to activate the same modified contactor assembly that activates the starter motor and the rotational movement is transmitted through a gear assembly to a reciprocating teethed bar that in turn causes a linear pulling force to set the brake assembly typically found in one or more of a vehicle's wheels. The system is selectively ignited by a switch that could be part of the ignition switch and it also includes a tension detector that interrupts the pulling action on the wheel brake after if reaches a predetermined maximum, typically when the wheel brake is set. Other switches in series are used to condition the operation of the pulling force to the occurrence or absence of certain conditions to ensure the proper functioning of the system, and visual or audio alarms are included to alert a user to such malfunctions. A spring assembly is adapted to return the teethed bar to its original position when the additional solenoid is deactivated.

13 Claims, 10 Drawing Sheets

PARKING BRAKE SYSTEM

BACKGROUND OF THE INVENTION

1. Field of the Invention

The present invention relates to brake systems and more particularly to those that can be actuated automatically through a switch, preferably the ignition switch.

2. Description of the Related Art

Many devices have been designed in the past implementing brake systems in vehicles of different types. Most of them require a user to exert a pulling force of relatively significant magnitude. None of these devices however are activated by a switch or the ignition switch typically found in these vehicles in the manner claimed in the present application.

The closest prior art to the best of Applicant's knowledge corresponds to U.S. Pat. No. 5,004,077 issued to Carlson in 1991. Even if it uses an electric motor, the starter motor of the vehicle is not used requiring the installation of an additional motor. Also, other features claimed here are not even suggested in this patent.

Other patents describing the closest subject matter provide for a number of more or less complicated features that fail to solve the problem in an efficient and economical way. Representative of these patents for brake systems are U.S. Pat. Nos. 3,455,418; 3,539,038; 4,224,832; 4,561,527; 4,629,043; 5,067,366; 5,119,912; 5,131,288; 5,178,237; and 5,180,038. None of these patents suggest the novel features of the present invention.

SUMMARY OF THE INVENTION

It is one of the primary objects of the present invention to provide a brake system for vehicles that can be automatically actuated by activating a switch, or the ignition switch with a contact position for this purpose.

It is another object of the present invention to provide a brake system that works in conjunction with a solenoid associated with a conventional vehicle engine's starter motor.

It is still another object of this invention to provide a brake system that can be readily activated by a user without requiring the use of force.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
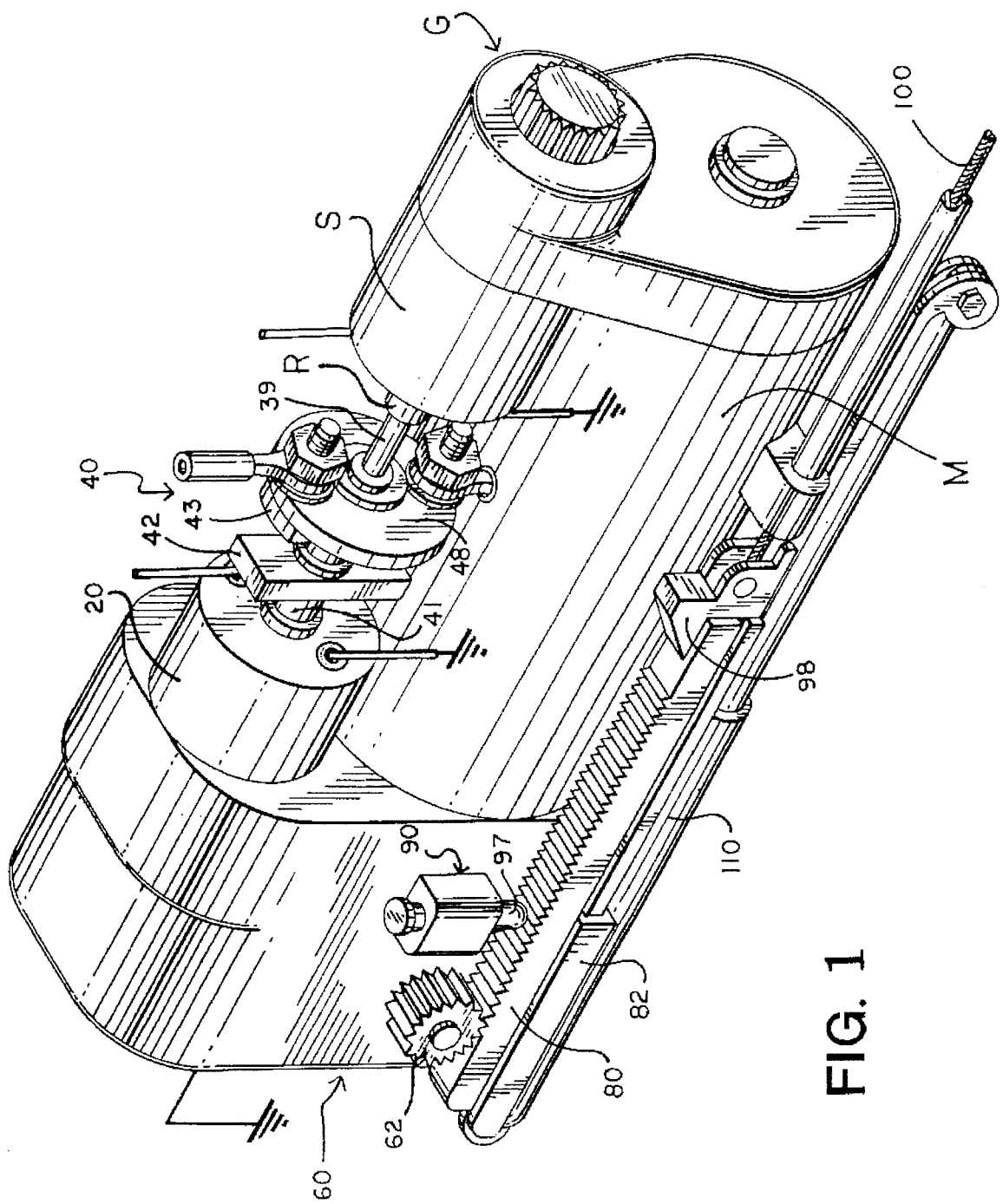
FIG. 1 represents an isometric view of a conventional engine starter motor M and its modified solenoid S to which the present invention has been added in cooperative combination.
Figure 2:
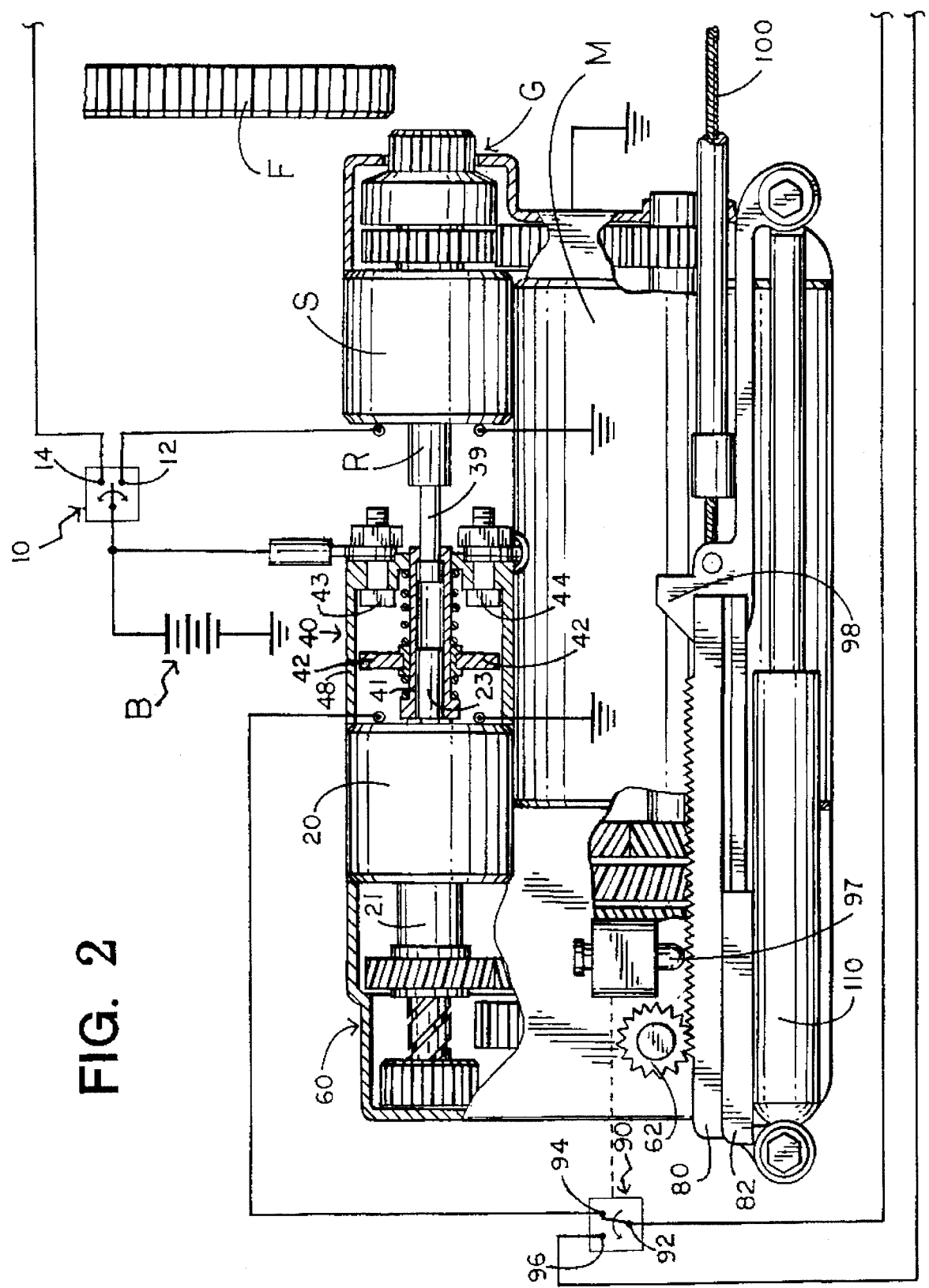
FIG. 2 shows an elevational side view of the device shown in FIG. 1 with partial cross-sections and with neither solenoids S or 20 being activated and contactor assembly 40 being shared by the solenoids.
Figure 5:
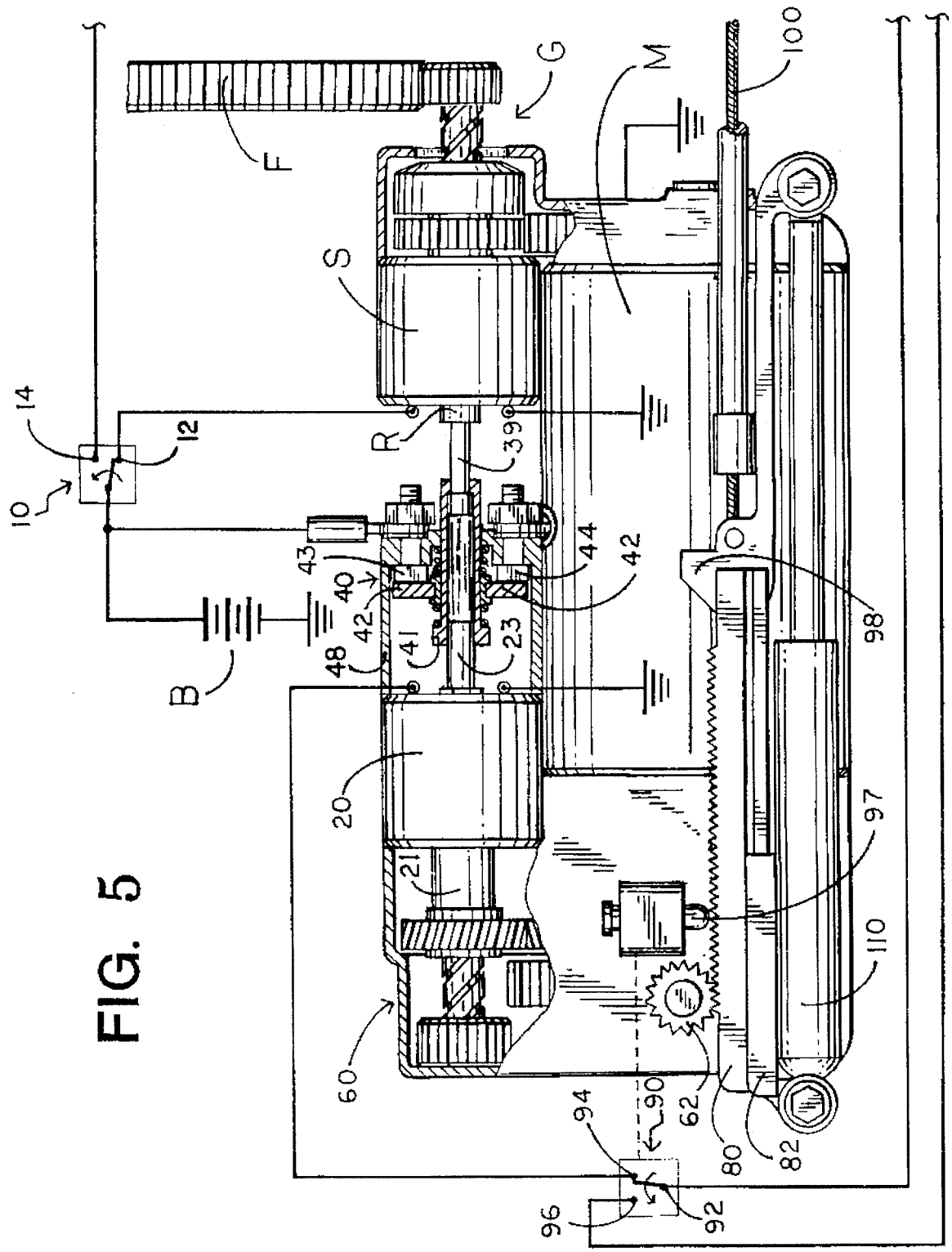
FIG. 5 shows the conventional operation of solenoid S to cause the engagement of gearbox assembly G to flywheel F in order to impart the rotational movement generated by motor M when the ignition switch is closed. Also, coupling member 41 is shown to the right activating motor M.

Referring now to the drawings, it be seen that starter motor M is of the conventional type including a solenoid S and pinion gear assembly G, as best seen in FIG. 1. Pinion gear assembly G engages to flywheel F upon actuation of ignition switch 10 (when in contact 12) that in turn activates solenoid S that slide coupler tubular member 41 and contactor assembly 40 to provide electric power to motor M, as seen in FIGS. 2 and 5. The present invention includes a mechanism that utilizes the mechanical movement of motor M to ultimately actuate the wheel brake typically found in one or more wheels of a vehicle. Through switch 10 (contact 14) a user activates solenoid 20 which in turn causes contactor assembly 40 to supply electric power to motor M and at the same time engages motor M to gearbox assembly 60. Pinion gear 62 causes teethed rod 80 to move over guide member 82 pulling in cord member 100 which results in the setting of wheel brake W. Spring assembly 110 is mechanically coupled to teethed rod 80 to bring it back to its original position when solenoid 20 is deactivated.

Figure 3:
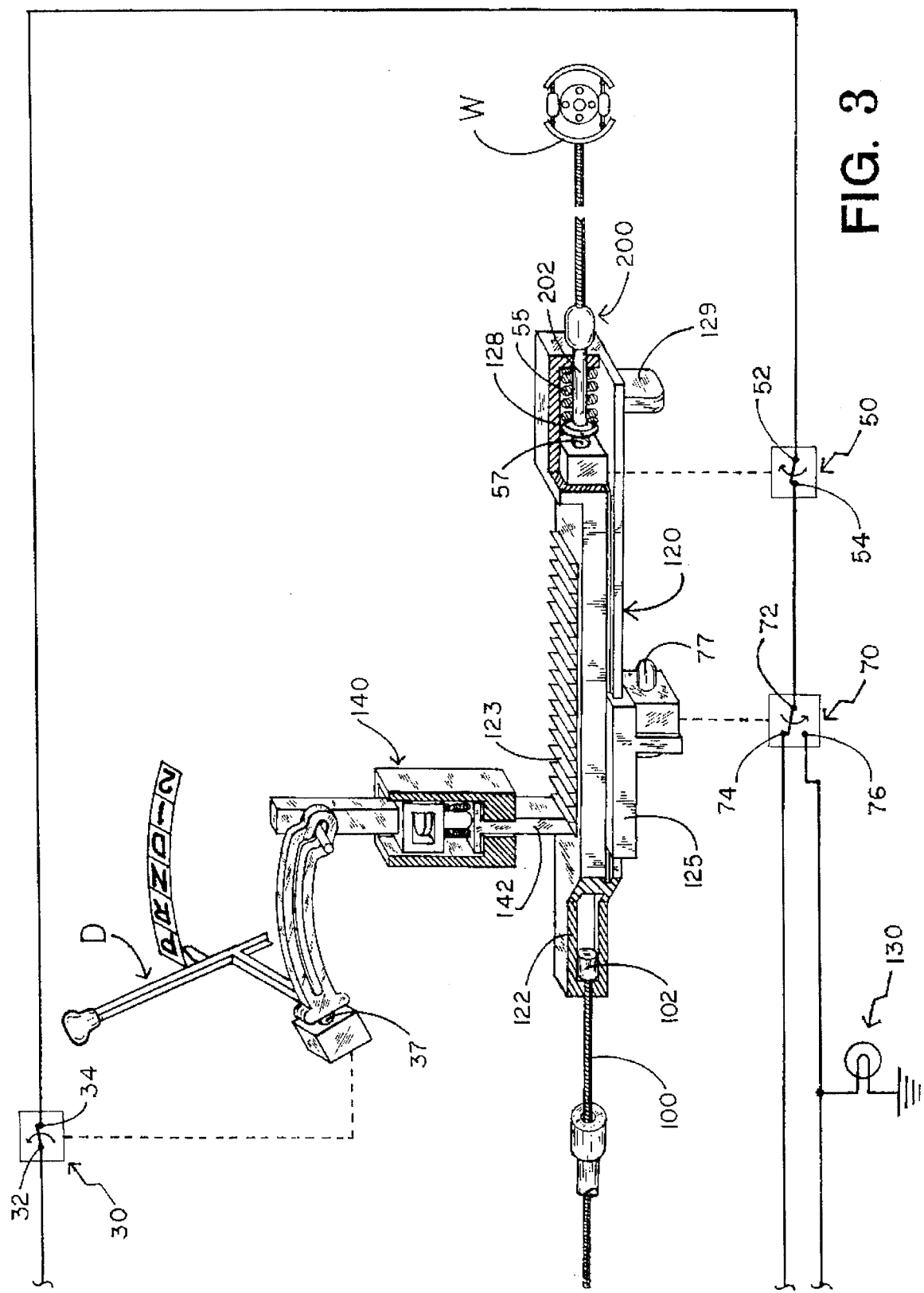
FIG. 3 illustrates isometrically and diagrammatically the switches that condition the activation of the present invention in the preferred embodiment and the components that are used to activate the wheel brake system W.

In FIGS. 2 and 3, the parking brake system incorporating the present invention is shown without being activated. Switch 10 corresponds to the ignition switch of a conventional vehicle with at least two contacts (one pole, two throws), in the preferred embodiment. Contact 12 activates solenoid S in the conventional way causing motor M to engage to flywheel F through pinion gear assembly G, as seen in FIG. 5.

Figure 6:
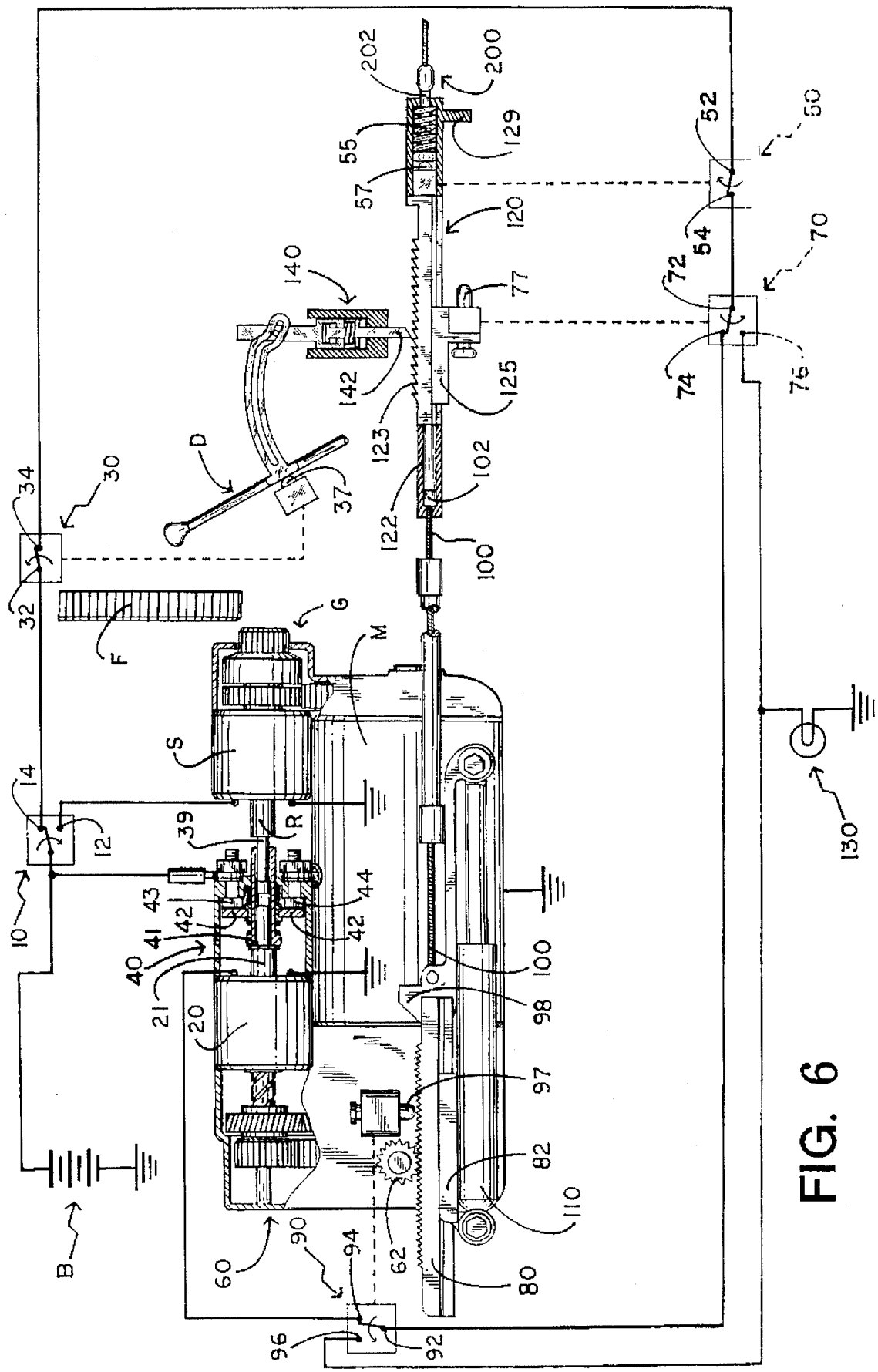
FIG. 6 shows the operation of the present invention when the other position for the ignition switch 10 is used causing electricity to flow through the switches in series and activating solenoid 20 sliding coupler member 41 which in turn causes contactor assembly 40 to transmit electric power to motor M and gearbox assembly 60 to move teethed rod 80 pulling cord member 100 setting the wheel brake.

Contact 14, in FIG. 2, connects the one electrode of the power supply B, or battery, to contact 32, in FIG. 3, of single pole, single throw stick switch 30 and its contact 34 in turn is electrically connected to contact 52 of single pole, single throw tension switch 50 and its contact 54 is electrically connected to pole contact 72 of single pole, double throw safety switch 70. Contact 74 of switch 70 is electrically connected to contact pole 92, in FIG. 2, of double throw, single pole switch 90 which in turn selectively connects with either contact 94 or contact 96. When contact 92 is connected to contact 94, solenoid 20 is electrically connected to the other switches which dictate the conditions for supplying it electrical power. If these conditions are met, then solenoid 20 is activated, engaging gearbox assembly 60 causing contact element 42 to close the circuit between contact terminal 43 and 44 thereby providing electrical power to motor M, as shown in FIG. 6. It is seen in this figure how teethed rod 80 is moved to the left by pinion gear 62 of gearbox assembly 60 which is activated by its engagement with motor M. Stick switch 30 is closed since driving stick is in "Park" because it is mechanically coupled to be closed only when the stick is in this position pressing actuator 37 of switch 30. Otherwise, stick switch 30 opens and the brake system cannot be activated. Therefore, this is one of the above mentioned conditions that needs to be satisfied, in the preferred embodiment, for the present invention to be activated. These switches, however, can be bypassed, or not used at all, and the invention will work independently from the position of the stick.

Figure 7:
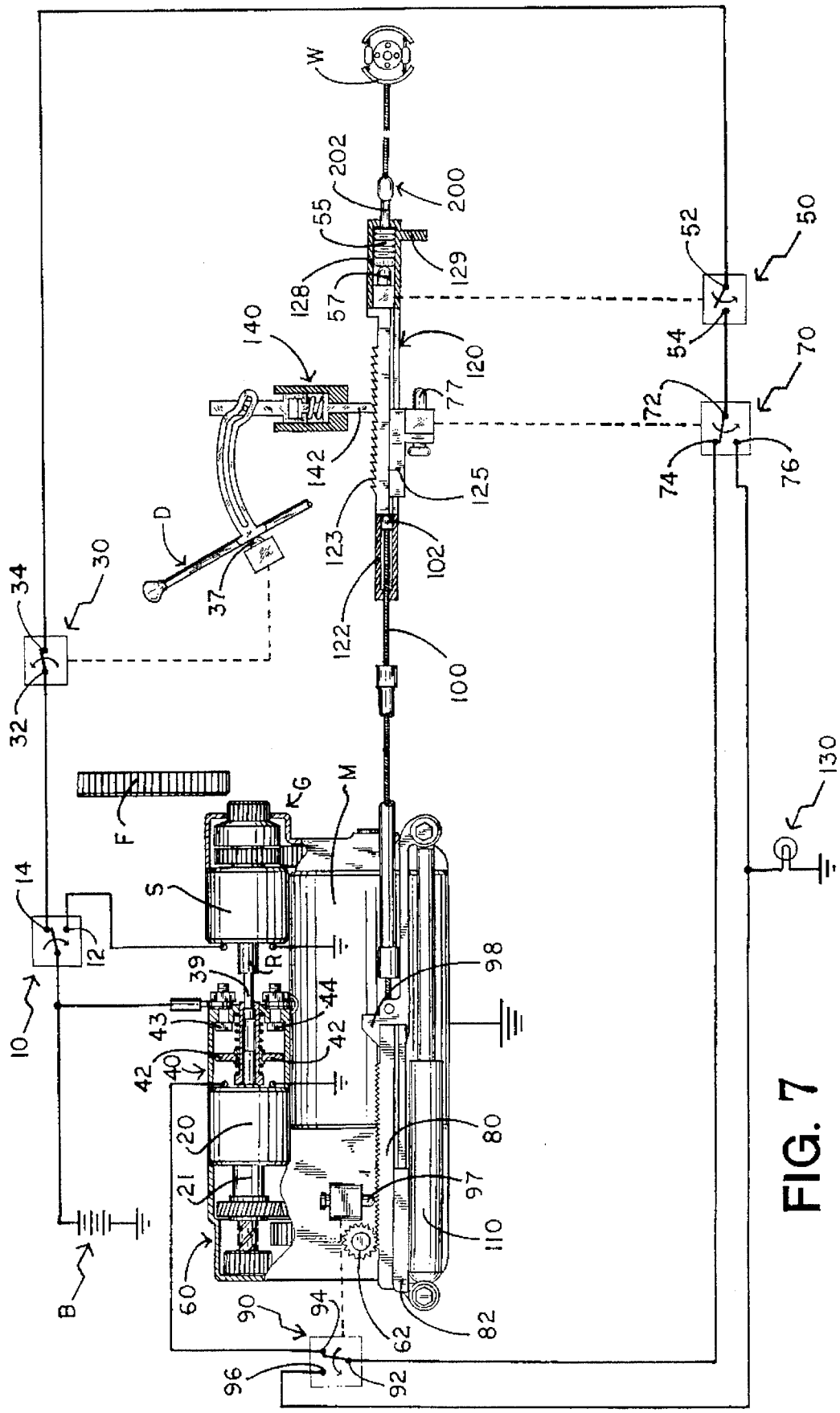
FIG. 7 is similar to FIG. 6 except that tensor switch 50 is open causing solenoid 20 to be deactivated and opening contactor assembly 40 thereby disengaging gearbox assembly 60. Teethed rod 80 has been brought to its original position (to the right) and termination 102 of cable 100 is housed within tubular housing 122.

Another condition that needs to be satisfied for the present invention to work, in the preferred embodiment, is that tension switch 50 needs to be closed. Switch 50 is in the closed position when the compression force of spring 55 is sufficient to press actuator 57 which is mechanically coupled to switch 50. When ratchet bar 120 is pulled over guiding assembly 125 (to the left) spring 55 is compressed by headed pin 202 against tubular housing 128. When the pulling force is sufficient to compress spring 55 enough to withdraw the force on actuator 57, then switch 50 opens as shown in FIG. 7 thereby deactivating solenoid 20. Then, gear assembly 60 disengages from motor M permitting rod 80 to come back to its original position and inserting the end 102 of cable 100 inside housing 122. All this is caused by the spring action of spring assembly 110.

Figure 8:
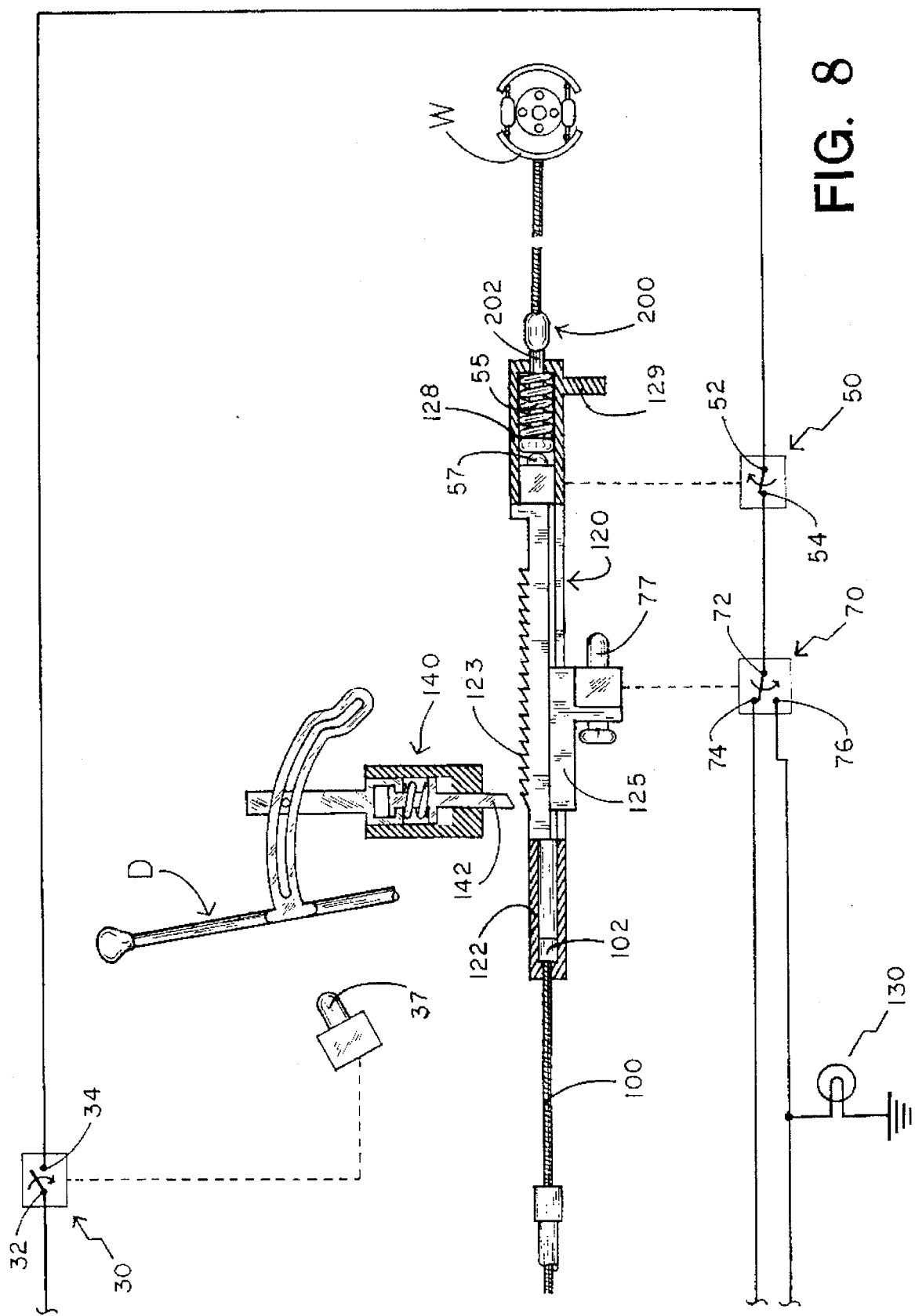
FIG. 8 is a representation of the stick of a vehicle in a position other than "Park" thereby causing stick switch 30 to open and preventing the present invention from operating even if all the other conditions are met. Ratchet bar 120 comes back to its original position closing tensor switch 50.

FIG. 8 shows wheel brake W released (and in its original position) when stick D is taken out of "Park", opening switch 30 and closing switch 50 simultaneously.

Figure 9:
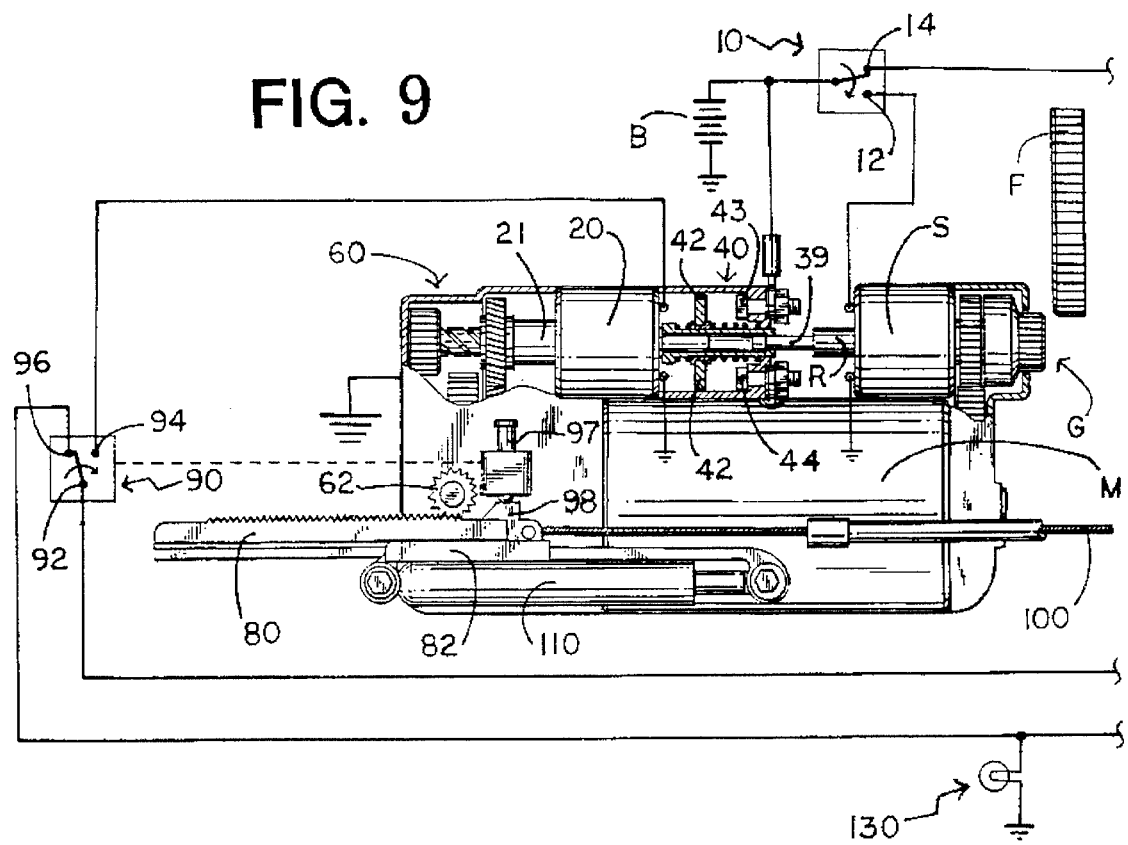
FIG. 9 shows safety switch 90 with contact element throw 97 interrupting the series circuit of the switches and activating alarm light 130.

In FIG. 9, it can be seen that teethed rod 80 is not allowed to go beyond a predetermined point since cam surface 98 acts on actuator 97 changing the connection from 94 to 96. Preferably, a visual alarm 130 is activated to alert a user.

Figure 10:
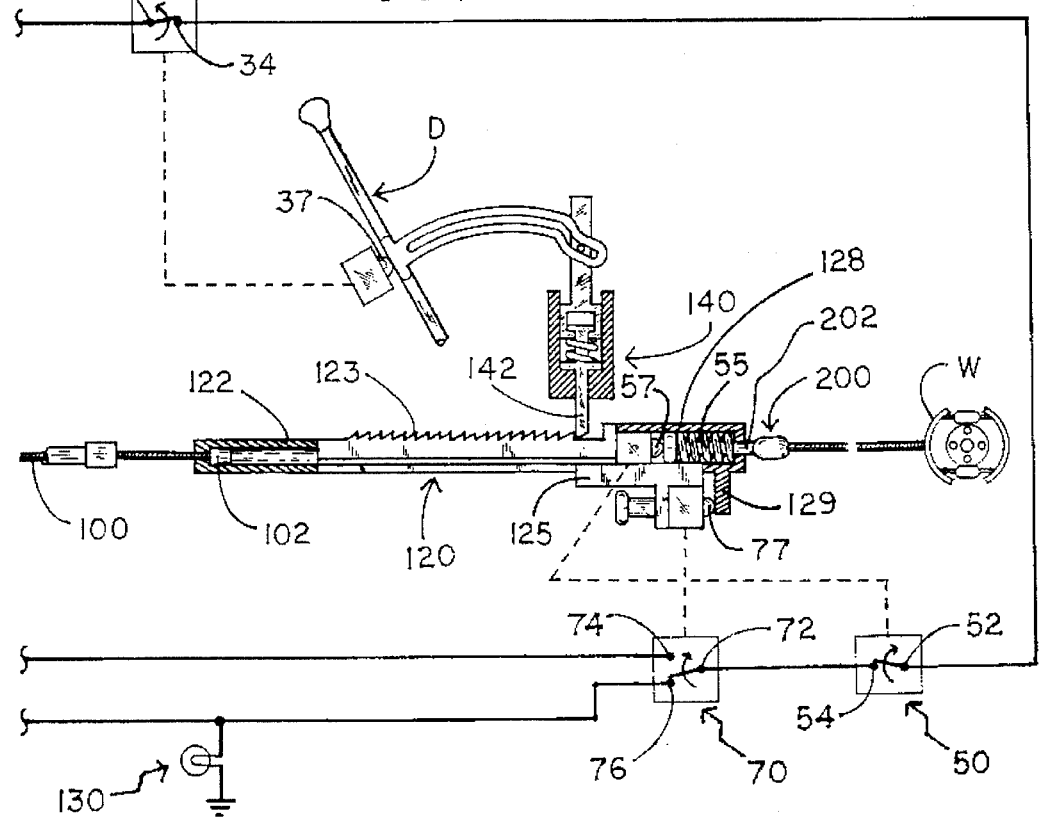
FIG. 10 shows safety switch 70 interrupting the series circuit of the switches and activating alarm light 130 when actuator 77 is pressed.

Still another desirable condition imposed in the preferred embodiment corresponds to requiring the contacts 72 and 74 of safety switch 70 to be electrically connected. The throw of safety switch 70 is changed (to contact 76) when stopper 129 is brought against switch actuator 77. This could happen if cable 200 breaks or if wheel brake W is worn out, or wheel brake W is being repaired or other similar reason as shown in FIG. 10.

Figure 11:
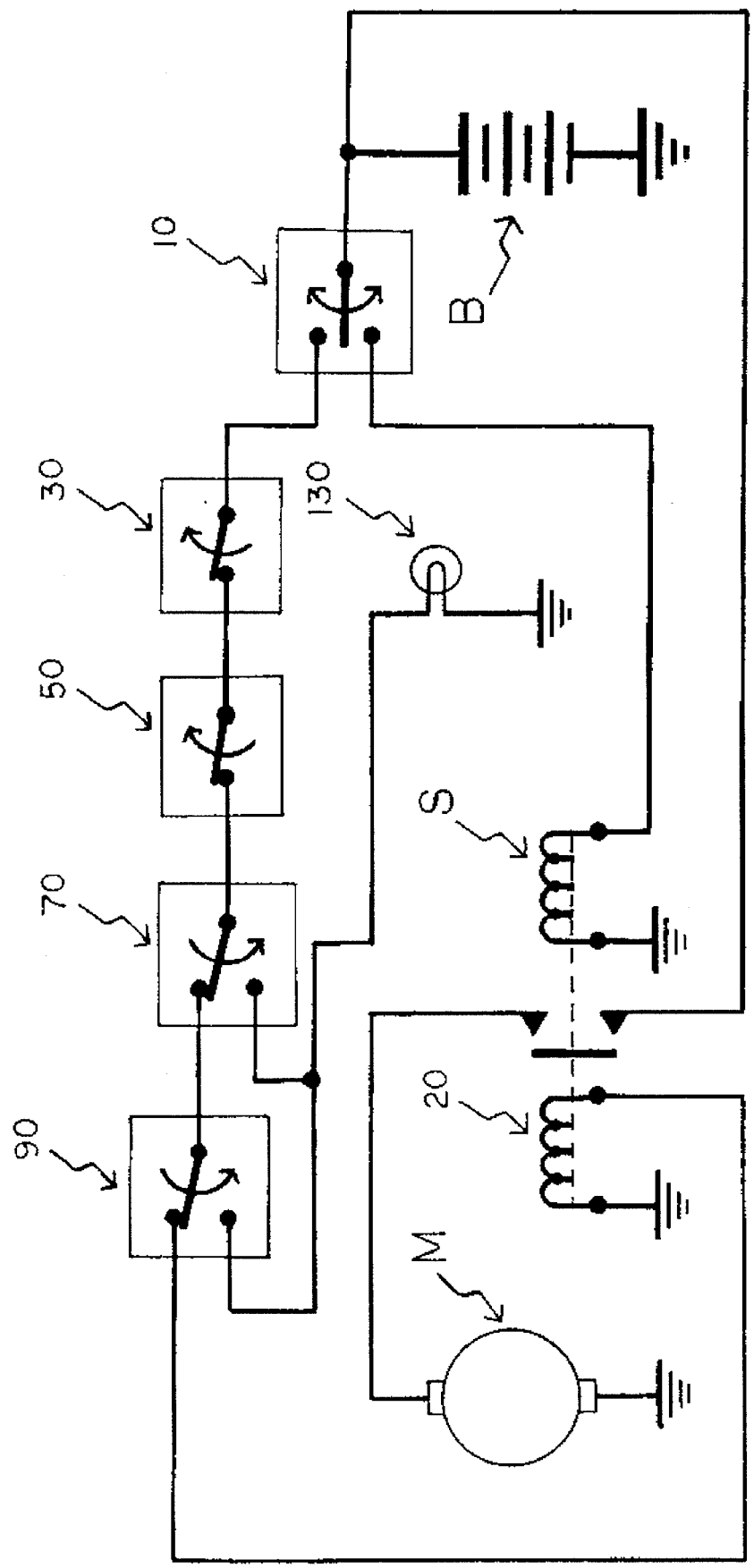
FIG. 11 is a diagram for the electrical circuit used in the present invention.

In FIG. 11 a schematic diagram of the electrical circuit used in the present invention is shown wherein starter motor M is activated when electrical power from battery B is supplied by either solenoid S or solenoid 20. Solenoid S is activated in a conventional manner by ignition switch 10. Solenoid 20, on the other hand, requires several conditions to be present to ensure that switches 30; 50; 70 and 90 make contact in series to provide electrical power to motor M. For switch 30 to be in the closed position, driving gear stick D needs to be in "Park", otherwise normally open switch 30 opens as it can be seen in FIG. 8. Also, it can be seen from this figure that the stick D is taken out of the "Park" position, lock assembly 140 disengages from ratchet bar 120. In the preferred embodiment, a mechanism is shown to position sawtooth end of ratchet element 142 over teeth 123 in locking releasable cooperation when stick D is moved to "Park" and, sawtooth end is releasable when stick D is moved out of parking. Ratchet element 142 jumps over teeth 123 when bar 120 moves to the left but it locks when the bar moves to the right. Tensor switch 50 is connected in series with switch 30 and switch 50 a normally open switch that is kept in closed by the spring force applied by spring 55 on headed pin 202 at the end of cable 200. If the pulling force exerted by motor M goes beyond a predetermined limit that causes the release of actuator 57, then switch 50 opens thereby interrupting the circuit. Safety switch 70 is a double throw switch with actuator 77 that changes the connection of contact 72 with contact 74 (to a connection between 72 and 76) when stopper 129 presses against actuator 77. If this happen the electric circuit is interrupted and the alarm light indicator 130 turns on. Other types of alarm can be used in order to call to the user's attention that a malfunctioning exists, such as the breaking of cable 200 causing ratchet bar 120 to travel all the way to the left. Finally, safety switch 90 is normally in the position shown in FIG. 6 where contact 92 is electrically connected to contact 94 and it is interrupted if teethed rod 80 goes a predetermined distance to the left causing cam surface 98 to push on actuator 97 thereby changing the switch position to make contact 92 to be electrically connected to contact 96, thereby causing alarm light indicator 130 to turn on. This can happen also when there is a malfunction such as when cable 100 breaks.

Figure 4A:
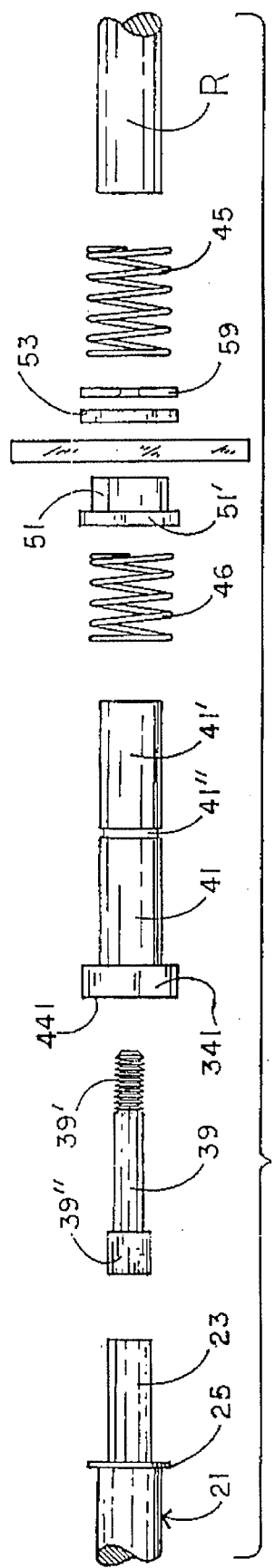
FIG. 4a is a representation of elements of the contactor assembly 40 disassembled.
Figure 4B:
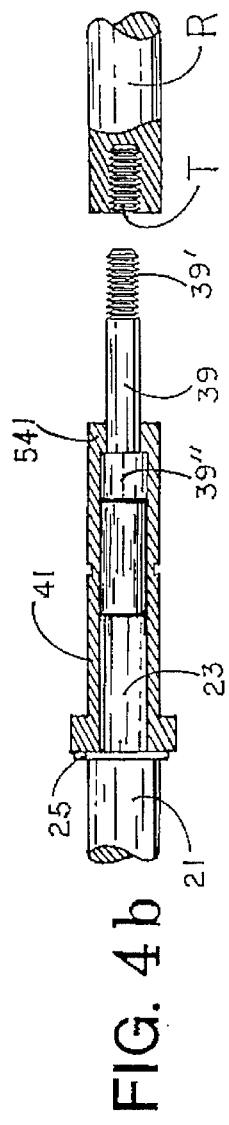
FIG. 4b is a cross-sectional representation of the tubular coupler member 41 with a partial representation of solenoid 20 moving rod 21 engaged to the tubular coupler member.
Figure 4C:
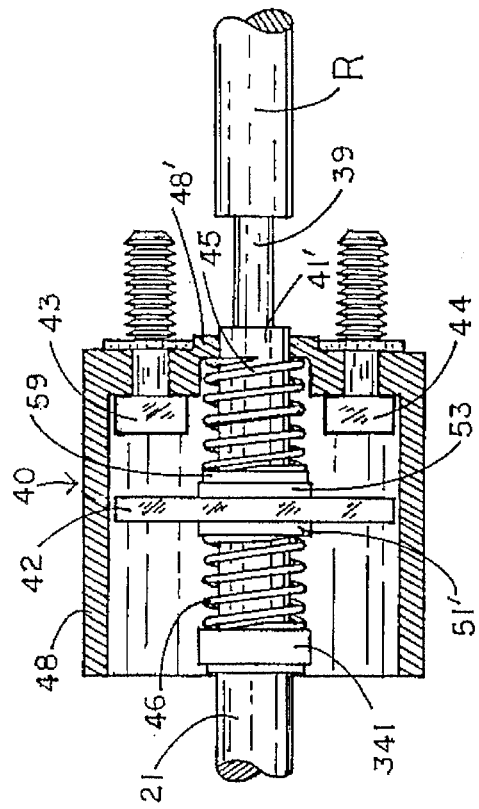
FIG. 4c is a cross-sectional view of the housing of the contactor assembly 40 with a partial representation of the moving rods 21 and R of the solenoids which have been represented without being activated.

Several internal components of contactor assembly 40 are shown in FIG. 4a in disassembled arrangement. In FIG. 4b tubular coupler member 41 is shown partially housing headed rod 39 that includes a head 39" and threaded end 39' that mates with internal thread T at one end of moving rod R of solenoid S. Head 39" comes in contact with internal surface 541'''' Moving rod 21 of solenoid 20 includes a narrower end 23 that is received within tubular coupler member 441. Headed end 41'''' of tubular coupler member 41 provides a surface for abutting contact with flange 25 that stops the insertion of rod 21 into member 41. In FIG. 4c housing 48 is shown in the preferred embodiment with a circular cross-section and it is provided with opening 48' that journals end 41' of tubular coupler member 41. Contact element 42 is mounted over insulating sleeve 51 and element 42 is sandwiched between flange 51' and insulating washer 53. Centrally located peripheral notch 41" provides a cooperative anchorage area for locking washer 59. Spring member 45 biases locking washer 59 away from contacts 43 and 44 and this spring bias is overcome only when solenoid S is activated and pulls headed rod 39, and in turn member 41, to the right thereby compressing spring member 45, upon element 42 hitting contacts 43 and 44. Any further pulling force applied by moving rod R will cause element 42 and sleeve 51 to slide to the left with respect to member 41 compressing spring 46 by flange 341''' against flange 51'. In this matter, any additional pulling force by rod R or pushing force by rod 21 is absorbed by spring 46 preventing warping damage to element 42.

It is to be noted that when solenoid S or solenoid 20 is activated, their respective moving rods R or 21 move coupler tubular member 41 which journals headed rod 39 and narrower end 23. In this manner, member 41 will always have a point of sliding support at its internal ends and at the same time member 41 will slide along the axes of end 23 or rod 39. When either end 23 or rod 39 moves, the other one stays in place along their axes and only serves as a point of sliding support for the sliding of member 41, without moving the moving rod of the solenoid that was not activated.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An automatic parking brake system for a vehicle with wheels and an electric power source that includes a electric starter motor contactor means having first and second contacts and a contact element for closing the circuit between said first and second contacts and said first contact being connected to said electric power source and said second contact being connected to said starter motor, first solenoid means for actuating said contactor means that in turn is activated by a first switch that is connected to said electric power source and said vehicle further including first gear means for meshed engagement with a flywheel in said vehicle to transmit the rotational movement from said starter motor to said flywheel and said vehicle including wheel brake means on at least one of the vehicle's wheels, and said parking brake system comprising:

A second solenoid means for actuating said contactor means thereby connecting said electric power source to said electric starter motor upon activation of said second solenoid means;

B second switch means for selectively activating said second solenoid means;

C second gear means for meshed engagement with said electric starter motor; and

D means for meshed engagement with said second gear means and for using the rotational movement of said second gear means to activate said wheel brake means.

2. The system set forth in claim 1 wherein said contactor means includes tubular coupling means to permit first and second solenoid means to actuate said contactor means independently from each other.

3. The system set forth in claim 2, further including:

E cable means for transmitting and causing said rotational movement to activate said brake assembly.

4. The system set forth in claim 3, further including:

F third switch means in series between said second solenoid means and said second switch means, and said third switch means being a normally open switch that includes an actuator; and G means for detecting the tension on said cable means and for activating the actuator of said switch when said cable means is kept below a predetermined tension by the rotational action of said second gear means.

5. The system set forth in claim 4 wherein said vehicle includes a drive shaft that is selectively positioned in Park by a user, further including:

H fourth switch means in series with said third switch means and said fourth switch means being a normally open switch having an actuator for maintaining said fourth switch means in the closed position while said stick is in the Park position.

6. The system set forth in claim 5, further including:

I means for translating the rotational movement of said second gear means to a linear movement used to activate said wheel brake means.

7. The system set forth in claim 6, further including:

J releasable ratchet means for selectively permitting said linear movement to take place in one direction only.

8. The system set forth in claim 7, further including:

K means for urging said means for translating the rotational movement of said second gear means to a linear movement to its original position.

9. The system set forth in claim 8, further including:

I fifth switch means in series with said fourth switch means and said fifth switch means being a normally closed switch having an actuator for opening said fifth circuit connection upon said means for translating the rotational movement reaching a predetermined position.

10. The system set forth in claim 9, further including:

M sixth switch means in series with said fifth switch means and said sixth switch means being a normally closed switch having an actuator for opening said sixth switch means when said cable means travel beyond a predetermined limit.

11. The system set forth in claim 10, further including:

N first alarm means for detecting the opening of said sixth switch means.

12. The system set forth in claim 9, further including:

O second alarm means for detecting the opening of said fifth switch means.

13. The system set forth in claim 12 wherein said releasable ratchet means in released when said drive stick is taken out to the Park position.

\* \* \* \* \*